United States Patent [19]
Berger

[11] Patent Number: 4,902,080
[45] Date of Patent: Feb. 20, 1990

[54] ADJUSTABLE DRAWER-FRONT MOUNT ASSEMBLY

[75] Inventor: Horst Berger, Bielefeld, Fed. Rep. of Germany

[73] Assignee: Hagenhenrich GmbH & Co. KG, Verl, Fed. Rep. of Germany

[21] Appl. No.: 295,222

[22] Filed: Jan. 9, 1989

[30] Foreign Application Priority Data

Jan. 18, 1988 [DE] Fed. Rep. of Germany ....... 3801195

[51] Int. Cl.<sup>4</sup> ............................................. A47B 88/00
[52] U.S. Cl. ............................. 312/348.4; 312/348.1; 403/194; 403/201
[58] Field of Search ............... 403/231, 201, 194, 264; 312/263, 330 R

[56] References Cited

U.S. PATENT DOCUMENTS 3,666,341  5/1972  Little .................. 312/330 R
4,120,598 10/1978  Zernig et al. ........... 312/263 X
4,131,376 12/1978  Busse ................. 403/231 X
4,288,887  9/1981  Johnson et al. ........... 403/231
4,740,098  4/1988  Witt ..................... 403/231
4,756,637  7/1988  Walz .................... 403/231
4,815,796  3/1989  Rock et al. .............. 312/263

FOREIGN PATENT DOCUMENTS 643312  6/1988  Fed. Rep. of Germany .

Primary Examiner—Joseph Falk
Attorney, Agent, or Firm—Charles E. Baxley

[57] ABSTRACT

A drawer side panel having an upright front edge flange formed with at least one throughgoing hole and normally extending parallel to a back face of a front panel which itself is formed with a pair of vertically spaced bores are secured together by a vertically elongated anchor unitarily formed with a pair of forwardly projecting inserts engaged in the bores of the front panel. A vertically elongated adaptor between the flange and the anchor is formed with at least one horizontally elongated hole aligned with the hole of the side-panel front flange and projects horizontally past the front flange. The adaptor has formations permitting itself to move vertically on the flange while preventing itself from moving horizontally on the flange. At least one screw engaging through the holes in the flange and through the hole in the adaptor is threaded into the anchor and has a head bearing forward on the flange and a shaft passing through the hole in the flange and substantially smaller both vertically and horizontally than the hole in the flange but vertically generally of the same size as the hole in the adaptor.

11 Claims, 2 Drawing Sheets

ADJUSTABLE DRAWER-FRONT MOUNT ASSEMBLY

FIELD OF THE INVENTION

The present invention relates to an assembly for mounting a drawer front on drawer sides. More particularly this invention concerns such a mount that is intended for use with sheet-metal drawer-side panels and that allows the drawer-front panel to be moved relative to the drawer sides.

BACKGROUND OF THE INVENTION

A drawer side panel such as described in commonly owned German Pat. document No. 3,643,312 normally has an upright front edge flange formed with at least one throughgoing hole and normally extending parallel to the back face of a drawer front panel. This back face is formed with a pair of vertically spaced bores. An adjustable assembly for securing the drawer side panel to the front panel comprises a vertically elongated anchor having a pair of forwardly projecting inserts or plugs engaged in the bores of the front panel, a vertically elongated adaptor between the flange and the anchor, formed with at least one horizontally elongated hole aligned with the hole of the front flange, and projecting horizontally past the front flange, and at least one screw engaging through the holes in the flange and through the hole in the adaptor, threaded into the anchor, and having a head bearing forward on the flange. The anchor inserts are secured by respective screws passing through vertically elongated slots in the anchor and the adaptor and drawer flange are formed in line with these slots with large access holes so that the insertsecuring screws can be manipulated.

Thus it is possible to loosen the screw or screws securing the drawer flange to the adaptor and shift the drawer side horizontally on the adaptor, and to loosen the screws securing the anchor plugs on the anchor to adjust the adaptor and drawer side vertically on the drawer front. As a result modest misalignments caused by sloppy manufacturing tolerances, poor installation, or out-of-square walls can be compensated for. A row of drawer fronts can be aligned perfectly with one another and with adjacent cabinet parts, with identical vertical and horizontal gaps all around.

Such an arrangement has the disadvantage that it has a multiplicity of parts that must be separately manufactured and then assembled. These parts can also become unattached and lost, and in general their construction and adjustment make this type of adjustable mount, which is typically used in a competitively priced factory cabinet, fairly expensive.

OBJECTS OF THE INVENTION

It is therefore an object of the present invention to provide an improved adjustable mount for a drawer front panel.

Another object is the provision of such an improved adjustable mount for a drawer front panel which overcomes the above-given disadvantages, that is which is relatively simple in construction so that it can be made at low cost and is easy to use.

SUMMARY OF THE INVENTION

According to this invention a drawer side panel having an upright front edge flange formed with at least one throughgoing hole and normally extending parallel to a back face of a front panel which itself is formed with a pair of vertically spaced bores are secured together by a vertically elongated anchor unitarily formed with a pair of forwardly projecting inserts engaged in the bores of the front panel. A vertically elongated adaptor between the flange and the anchor is formed with at least one horizontally elongated hole aligned with the hole of the side-panel front flange and projects horizontally past the front flange. The adaptor has formations permitting itself to move vertically on the flange while preventing itself from moving horizontally on the flange. At least one screw engaging through the holes in the flange and through the hole in the adaptor is threaded into the anchor and has a head bearing forward on the flange and a shaft passing through the hole in the flange and substantially smaller both vertically and horizontally than the hole in the flange but vertically generally of the same size as the hole in the adaptor.

Thus with the system of this invention the anchor plugs or inserts are not separate pieces held on by separate screws, so the arrangement has four fewer separate parts—the two separable anchor plugs and their two screws—than the prior-art assembly. Merely loosening the one or two screws passing through both the side-panel flange and the adaptor allows the system to be adjusted both vertically and horizontally.

In accordance with a further feature of this invention the formations on the adaptor are backwardly projecting and vertically extending ridges that horizontally snugly flank the flange. In addition the adaptor and flange have horizontally extending and interengaging catch formations normally retaining the adaptor against relative vertical displacement, but deformable to permit such displacement. These formations are constituted as a plurality of vertically spaced and horizontally extending ridges on the flange and a forwardly deflectable tooth on the adaptor engaged in the horizontal ridges of the flange. The adaptor is formed integrally with a deflectable tongue having a free end formed with the tooth. The function of this structure is to allow a vertical position to be set and retained even while the screw or screws are not tightened home, as otherwise the weight of the front panel would pull this panel down as soon as it was released.

According to a further feature of this invention the anchor and adaptor are formed with horizontally extending and interengaging formations permitting relative horizontal displacement but preventing relative vertical displacement. These formations include a horizontally projecting boss and a horizontally open notch receiving the boss.

The adaptor of this invention is formed with a pair of vertically extending and forwardly projecting ridges spacedly embracing the anchor and the anchor is formed with respective outwardly extending and elastically deformable tabs bearing elastically against the respective ridges and normally horizontally centering the anchor between the ridges. These tabs are unitarily formed with the anchor which, like the adaptor, is made of a durable synthetic resin.

To further dress up the assembly and cover any potentially sharp edges of the normally sheet-metal drawer side panel the adaptor has an upper end formed with a rearwardly projecting downwardly U-section extension engaging over the drawer side panel.

Constructions is further simplified when the anchor is formed adjacent each insert with one such screw-receiving hole. In fact the screws can serve to expand the anchors and lock them in the holes of the drawer front. These anchor inserts are vertically spaced and adjacent upper and lower ends of the anchor, adaptor, and side-panel front edge.

DESCRIPTION OF THE DRAWING

The above and other objects, features, and advantages will become more readily apparent from the following, reference being made to the accompanying drawing in which.

SPECIFIC DESCRIPTION

Figure 1:
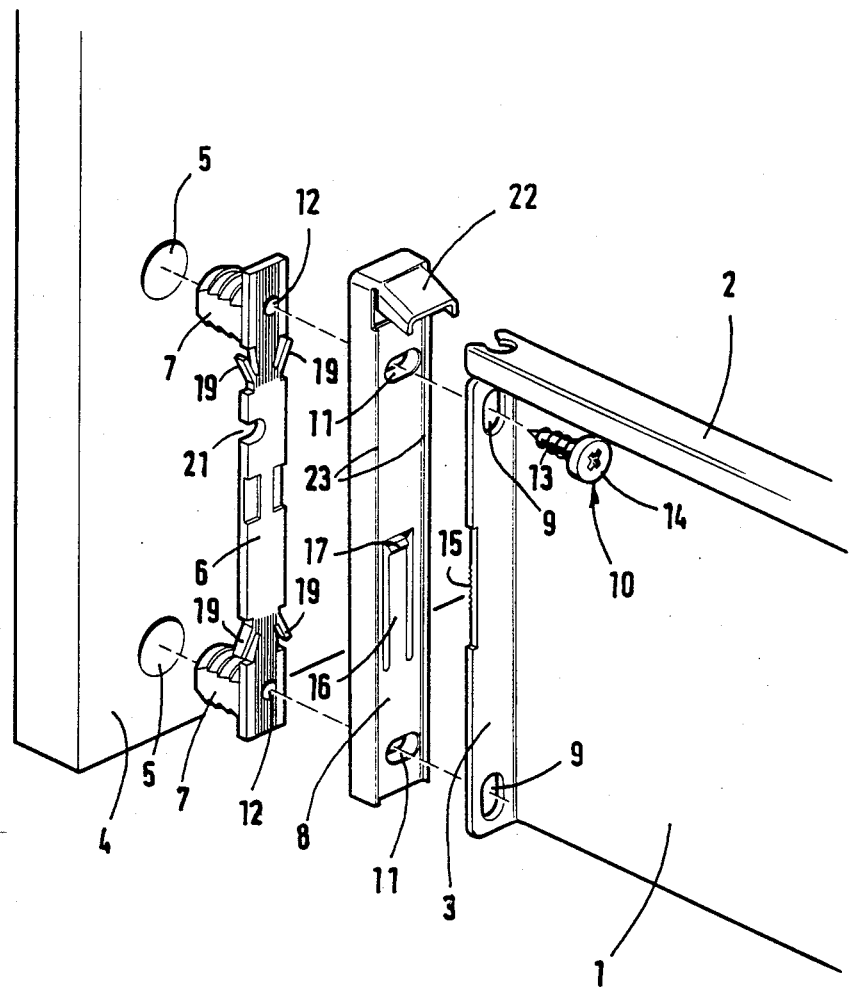
FIG. 1 is an exploded perspective view of the mount assembly according to this invention seen from the outside rear.

As seen in the drawing a drawer side panel 1 made of sheet metal has an outwardly and downwardly bent horizontal top flange 2 and an outwardly and laterally bent vertical front flange 3. A drawer front panel 4 has a vertical rear face formed with a pair of vertically spaced and rearwardly open blind bores 5.

A one-piece synthetic-resin anchor piece 6 formed basically as a vertical bar has a front face formed with a pair of ridged anchor plugs 7 that fit tightly into the bores 5. An adaptor bar 8 fits between this anchor 6 and the flange 3. The flange 3 itself is formed generally level with the centers of the anchor plugs 7 and the holes 5 with holes 9 through which pass screws 10. In addition the adaptor 8 is formed aligned with these holes 9 with respective horizontally elongated slots or holes 11 and the anchor 5 is formed in line with the centers of the holes 9 and 11 with holes 12. The screw 10 (only one shown) each have a threaded shaft 13 which is substantially smaller than either the vertical or horizontal dimension of the respective hole 9 and than the horizontal but not the vertical dimension of the respective slot 11 and a relatively large head 14.

It is therefore possible when the screws 10 extend through the holes 9 and 11 into the holes 12 but before the heads 14 are pulled down tight to move the drawer side panel 2 both vertically and horizontally relative to the drawer front panel 4. The adaptor 8 cannot move vertically relative to the drawer side panel 2 or screws 10.

In addition the rear of the adaptor 8 is formed at its vertical edges with rearwardly projecting straight ridges 23 that are horizonally spaced to closely flank the flange 3. Thus the drawer side panel 2 cannot move horizontally relative to the adaptor 8.

On its front face about centrally between the two holes 9 the flange 3 is formed with a plurality of vertically spaced horizontal ridges 16. A tongue 16 punched out of the center of the adaptor bar 8 has a free end formed with a rearwardly directed tooth 17 that always is level with the field of ridges 15, no matter where in the holes 9 the shanks 13 of the screw 10 are. The purpose of tooth 17 and the ridges 15 tis to maintain a vertical setting against unintentional resetting when the screws 10 are loosened somewhat.

Figure 2:
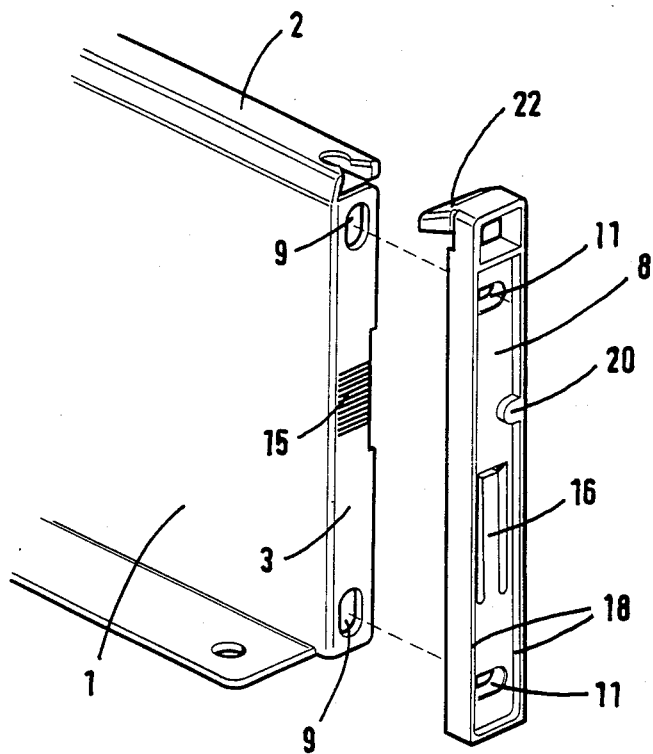
FIG. 2 is another exploded perspective view of parts of the assembly seen from the inside front.

As best seen in FIG. 2 the front face of the adaptor 8 is formed at both side edges with forwardly directed ridges 18 that project by a distance equal at least to the front-to-back thickness of the anchor bar 6, but that are spaced apart somewhat more than the side-to-side width of this bar 6. In its turn the bar 8 is formed on each of its sides with a laterally projecting angled tab 19 that can be deflected laterally and that normally bears on the inside of the respective ridge 18. These elastic tabs 19 therefore normally urge the adaptor bar 8 into a position horizontally centered on the anchor bar 6.

In order to further impede the adaptor 8 from moving vertically relative to the anchor 6 the former is formed on its front face with a bump 20 projecting horizontally inward from one of the ridges 18. The anchor 6 is formed with a complementary laterally open recess or pocket 21 into the which this boss 20 fits. The fit is such between the two formations 20 and 21, which could be reversed with the notch 21 on the part 8 and the boss 20 on the part 6, that they permit relative horizontal movement but effectively prevent relative vertical movement, even if the screws 9 are not in place.

Finally the top of the adaptor bar 8 is formed with a rearwardly and downwardly projecting U-section extension 22 that engages down over the top flange 2 of the side panel 1. This extension 22 is vertically and horizontally deflectable and serves principally to form a clean continuation between the adaptor 8 and the drawer side 1, that is its function is purely to dress up the assembly.

Once this system is assembled, it is possible to adjust the drawer front 4 by loosening the screws 10 slightly and sliding the drawer front 4 horizontally and vertically into the desired position, then retightening the screws 10. The tongue 17 fitting in the ridges 15 prevents the drawer front 4 from dropping from its own weight, but still allows it to be forcibly moved vertically if necessary and the tongues 19 insure that to start with at least the adaptor 8 will be centered on the anchor 6.

I claim:

1. An assembly comprising a drawer side panel and a drawer front panel, for adjustably mounting the side panel to a back face of the front panel;

the side panel having an upright front edge flange formed with at least one throughgoing hole and normally extending parallel to the back face of the front panel and the back face being formed with a pair of vertically spaced bores;

a vertically elongated anchor unitarily formed with a pair of forwardly projecting inserts engaged in the bores of the front panel;

a vertically elongated adaptor between the flange and the anchor, formed with at least one horizontally elongated hole aligned with the hole in the sidepanel front flange, and extending horizontally outward of the front flange, the adaptor being formed with first means for permitting the adaptor to move vertically on the flange while preventing the adaptor from moving horizontally on the flange;

the adaptor and the flange having horizontally extending and interengaging second means for normally retaining the adaptor against relative vertical displacement, but deformable to permit such displacement; and at least one screw engaging through the hole in the flange and through the hole in the adaptor, threaded into the anchor, and having a head bearing forward on the flange and a shaft passing through the hole in the flange and substantially smaller both vertically and horizontally than the hole in the flange but vertically generally of the same size as the hole in the adaptor.

2. The assembly defined in claim 1 characterized further in that the first means are backwardly projecting and vertically extending ridges that horizontally snugly flank the flange.

3. The assembly defined in claim 1 characterized further in that the adaptor has an upper end formed with a rearwardly projecting downwardly U-section extension engaging over the drawer side panel.

4. The assembly defined in claim 1 characterized further in that the anchor is formed adjacent each insert with one such screw-receiving hole.

5. The assembly defined in claim 4 characterized further in that the anchor inserts are spaced vertically and adjacent upper and lower ends of the anchor, adaptor, and side-panel front edge.

6. An assembly comprising a drawer side panel and a drawer front panel, for adjustably mounting the side panel to a back face of the front panel;
- the side panel having an upright front edge flange formed with at least one thoroughgoing hole and normally extending parallel to the back face of the front panel and the back face being formed with a a pair of vertical spaced bores;
- a vertically elongated anchor unitarily formed with a pair of forwardly projecting inserts engaged in the bores of the front panel;
- a vertically elongated adaptor between the flange the anchor, formed with at least one horizontally elongated hole aligned with the hole in the side-panel front flange, and extending horizontally outward of the front flange, the adaptor being formed with first means for permitting the adaptor to move vertically on the flange while preventing the adaptor from moving horizontally on the flange;
- the adaptor and the flange having horizontally extending and interengaging second means normally retaining the adaptor against relative vertically displacement, means for making the second means deformable to permit such displacement; and
- at least one screw engaging through the hole in the flange and through the hole in the adaptor, threaded into the anchor, and having a head bearing forward on the flange and shaft passing through the hole in the flange and substantially smaller both vertically and horizontally than the hole in the flange but vertically generally of the same size as the hole in the adaptor.

7. The assembly defined in claim 6 characterized further in that second means include a plurality of vertically spaced and horizontally extending ridges on the flange and a forwardly deflectable tooth on the adaptor engaged in the horizontal ridges of the flange.

8. The assembly defined in claim 7 characterized further in that the adaptor is formed integrally with a deflectable tongue having a free end formed with the tooth.

9. An assembly comprising a drawer side panel and a drawer front panel, for adjustably mounting the side panel to a back face of the front panel;
- the side panel having an upright front edge flange formed with at least one hole and normally extending parallel to the back face of the front panel and the back face being formed with a a pair of vertically spaced bores;
- a vertically elongated anchor unitarily formed with a pair of forwardly projecting inserts engaged in the bores of the front panel;
- a vertically elongated adaptor between the flange and the anchor, formed with at least one horizontally elongated hole aligned with the hole in the side-panel front flange, and extending horizontally outward of the front flange, the adaptor being formed with first means for permitting the adaptor to mover vertically on the flange while preventing the adaptor from moving horizontally on the flange;
- the adaptor and the flange having horizontally extending and interengaging second means normally retaining the adaptor against relative vertical displacement, means for making the second means deformable to permit such displacement;
- at least one screw engaging through the hole in the flange and through the hole in the adaptor, threaded into the anchor, and having a head bearing forward on the flange and a shaft passing through the hole in the flange and substantially smaller both vertically and horizontally than the hole in the flange but vertically generally of the same size as the hole in the adaptor;
- the anchor and adaptor formed with horizontally extending and interengaging formations permitting relative horizontal displacement but preventing relative vertical displacement; and
- the interengaging formations of the anchor and adaptor including a horizontally projecting boss and a horizontally open notch receiving the boss.

10. An assembly comprising a drawer side panel and a drawer front panel, for adjustably mounting the side panel to a back face of the front panel;
- the side panel having an upright front edge flange formed with at least one hole and normally extending parallel to the back face of the front panel and the back face being formed with a a pair of vertically spaced bores;
- a vertically elongated and anchor unitarily formed with a pair of forwardly projecting inserts engaged in the bores of the front panel;
- a vertically elongated adaptor between the flange and the anchor, formed with at least one horizontally elongated hole aligned with the hole in the side-panel front flange, and extending horizontally outward of the front flange, the adaptor being formed with first means for permitting the adaptor to move vertically on the flange while preventing the adaptor from moving horizontally on the flange;
- the adaptor and the flange having horizontally extending and interengaging second means normally retaining the adaptor against relative vertical displacement, means for making the second means deformable to permit such displacement;
- at least one screw engaging through the hole in the flange and through the hole in the adaptor, threaded into the anchor, and having a head bearing forward on the flange and a shaft passing through the hole in the flange and substantially smaller both vertically and horizontally than the hole in the flange but vertically generally of the same size as the hole in the adaptor;
- the adaptor formed with a pair of vertically extending and forwardly projecting ridges spacedly embracing the anchor, the anchor being formed with the respective outwardly extending and elastically deformable tabs bearing elastically against respective ridges and normally horizontally centering the anchor between the ridges.

11. The assembly defined in claim 10 characterized further in that the tabs are formed unitarily with the anchor.

* * * * *